United States Patent [19]

Kennel

[11] Patent Number: 4,462,909

[45] Date of Patent: Jul. 31, 1984

[54] SURFACE SKIMMER MEANS FOR SETTLING TANK

[75] Inventor: George W. Kennel, White Plains, N.Y.

[73] Assignee: Dorr-Oliver Incorporated, Stamford, Conn.

[21] Appl. No.: 482,035

[22] Filed: Apr. 4, 1983

[51] Int. Cl.³ .............................................. B01D 21/06
[52] U.S. Cl. .................................... 210/525; 210/528; 210/538; 210/776
[58] Field of Search ...................... 210/242.3, 523, 525, 210/528, 529, 530, 532.1, 533, 538, 776, 608

[56] References Cited

U.S. PATENT DOCUMENTS

| | | | |
|---|---|---|---|
| 2,124,284 | 7/1938 | Boie | 210/523 X |
| 2,822,928 | 2/1958 | Wormser et al. | 210/523 |
| 2,826,306 | 3/1958 | Burns | 210/533 X |
| 2,880,876 | 4/1959 | Dujardin | 210/525 X |
| 3,627,132 | 12/1971 | Kelly et al. | 210/525 X |
| 3,919,090 | 11/1975 | Shaffer | 210/525 X |
| 4,043,920 | 8/1977 | Wooh | 210/529 X |
| 4,341,643 | 7/1982 | Brodoff | 210/532.1 |

Primary Examiner—Ernest G. Therkorn
Assistant Examiner—W. Gary Jones
Attorney, Agent, or Firm—Burtsell J. Kearns

[57] ABSTRACT

A surface skimmer means for a settling tank comprises curved skimmer blades extending across the diameter of the tank and are interconnected to and movable with the main rake structure of the tank wherein cam actuated means are provided for pivoting the blades about a pivot arm to the periphery of the tank to move floating material to a collector tank for discharge from the tank.

10 Claims, 4 Drawing Figures

FIG. 1
FIG. 2
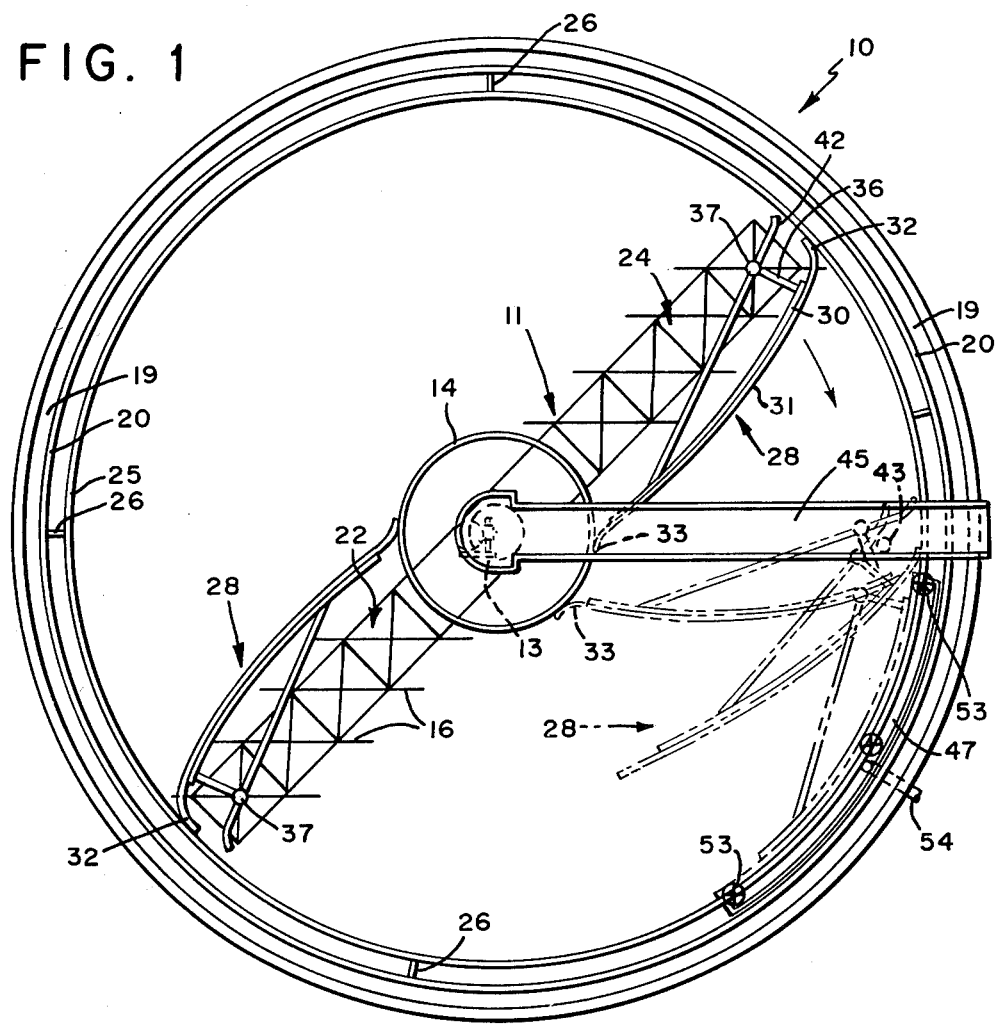
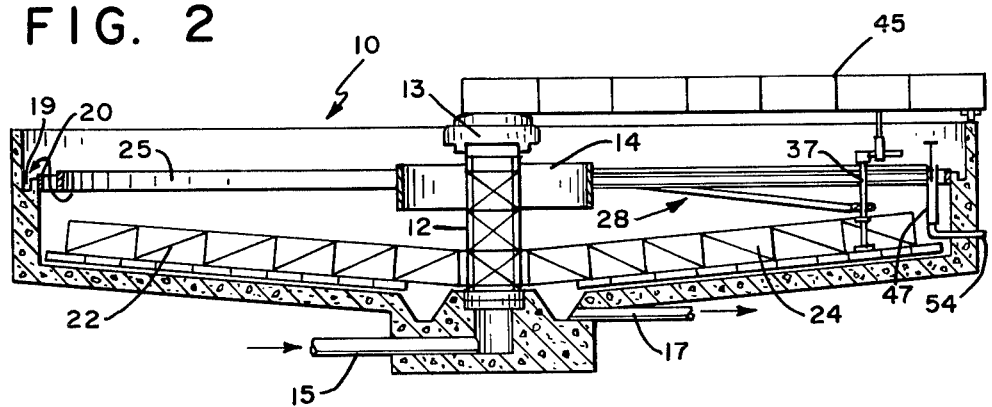

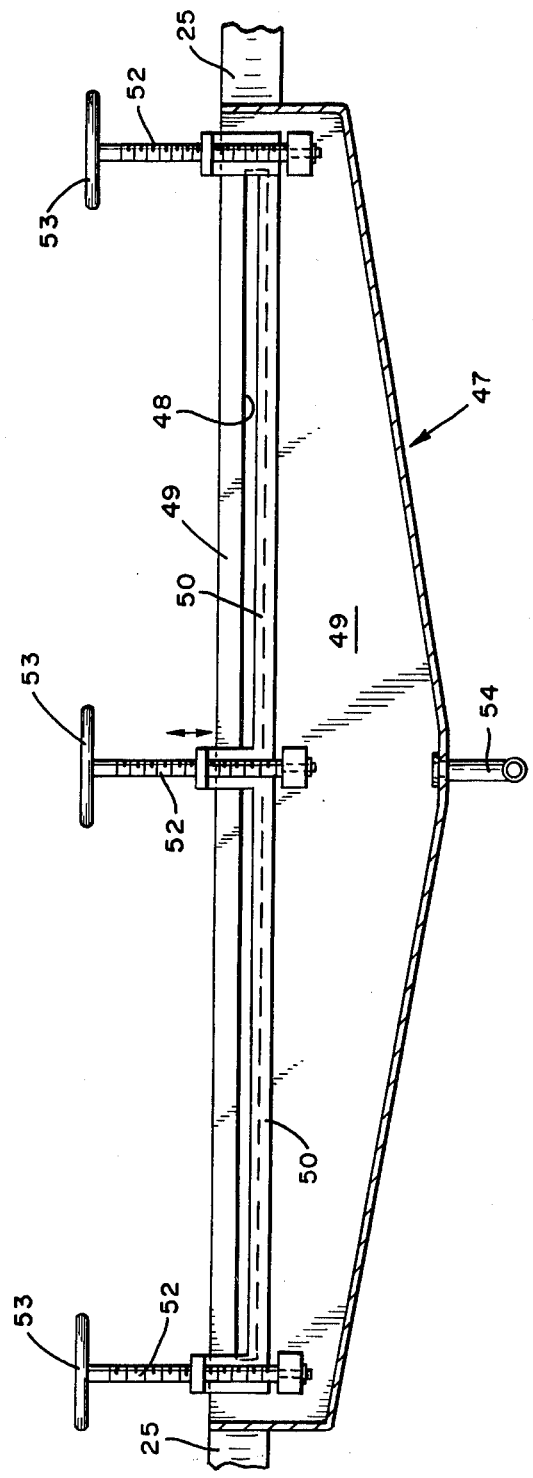

SURFACE SKIMMER MEANS FOR SETTLING TANK

BACKGROUND OF THE INVENTION

The present invention is directed to new and useful improvements in sedimentation apparatus and in particular to skimmer mechanisms for clarifiers or thickeners utilizing rotary rake type settling tanks.

Settling tanks utlizing rotary rake mechanisms are well known for use in the separation of solids from a liquid suspension such as in waste water or sewage treatment wherein solids are settled to the tank bottom. A central rotary rake structure is provided for raking the sludge or other solids that settle from the suspension to a central sump outlet located in the tank bottom while the supernatant or clarified liquid is removed at an overflow launder at the upper peripheral boundary of the tank.

In the treatment of certain suspensions very light solids float to the top of the liquid and form a scum on the surface thereof which must be removed. In the past there have been many types of skimming devices proposed or employed for removing this floating material such as surface conveyers or rotating skimmer blades which move the floating material to appropriate traps or boxes. Such latter type mechanisms are disclosed for example in U.S. Pat. No. 3,919,090 or U.S. Pat. No. 4,341,643 wherein rotating skimmer arms having a scum remover at one end thereof are provided to sweep across the upper surface of the liquid level in a settling tank to move the scum up an inclined surface into a scum discharge box. A similar type skimmer is also disclosed in U.S. Pat. No. 2,822,928 which discloses a skimmer arm and blade which are rotated about the upper surface of the liquid in the clarifier. The blade is provided with a squeegee surface for sweeping the floating scum matter up a ramp into a discharge box. Prior art patents such as U.S. Pat. No. 2,124,284 or U.S. Pat. No. 2,880,876 utilize endless belt type conveyer devices at the upper surface of the liquid for removing the floating layer from the liquids.

Although the skimmer devices of these prior disclosures may have proven effective for their intended purposes they are of a generally complex construction increasing the requirements of the main rake and drive structure supporting the same and are generally not effective throughout the entire diameter of the settling tank for insuring a clean sweeping movement of the floating material to a discharge point at the periphery or other point of discharge in the settling tank.

It is the object of the present invention to provide a novel skimmer means for settling tank that provides for a full diameter sweep across the surface of the liquid.

Another object is to provide a novel skimmer and discharge collector without the use of ramps or other similar complex mechanisms within the tank.

A further object is to provide a novel means for effecting a full radius sweep of an individual skimmer arm to a discharge point at the periphery of the tank and including means for automatically restoring the skimmer to an operative sweeping position after removal of the floating maerial.

BRIEF SUMMARY OF THE INVENTION

The present invention contemplates a novel skimmer means for a settling tank which include a pair of skimmer mechanisms carried by the rake structure of a sedimentation tank and which mechanisms include blades provided with elongated squeegee or wiper members having opposite ends engaging a central feedwell of the tank and a baffle member concentric to and spaced from the sidewalls of the tank. A cam arm is attached to the skimmer blade and is adapted to engage a cam actuating member at a predetermined point in the rotation of the rake structure to cause the blade to rotate in the direction of the periphery of the tank to move the floating material to a collector secured to the baffle. As the cam arm moves clear of the actuating member the skimmer blade is restored to its full radius position by spring means.

The above and other objects and advantages of the present invention will appear more fully hereinafter from a consideration of the detailed description which follows taken together with the accompanying drawing wherein one embodiment of the present invention is illustrated.

DESCRIPTION OF THE DRAWINGS

In the drawings:

FIG. 1 is a plan view of a settling tank which incorporates one embodiment of the present invention;

FIG. 2 is a cross sectional elevational view of the settling tank taken of FIG. 1;

FIg. 4 is a sectional view of the scum collector tank taken on the line 4—4 of FIG. 3.

DETAILED DESCRIPTION

Figure 3:
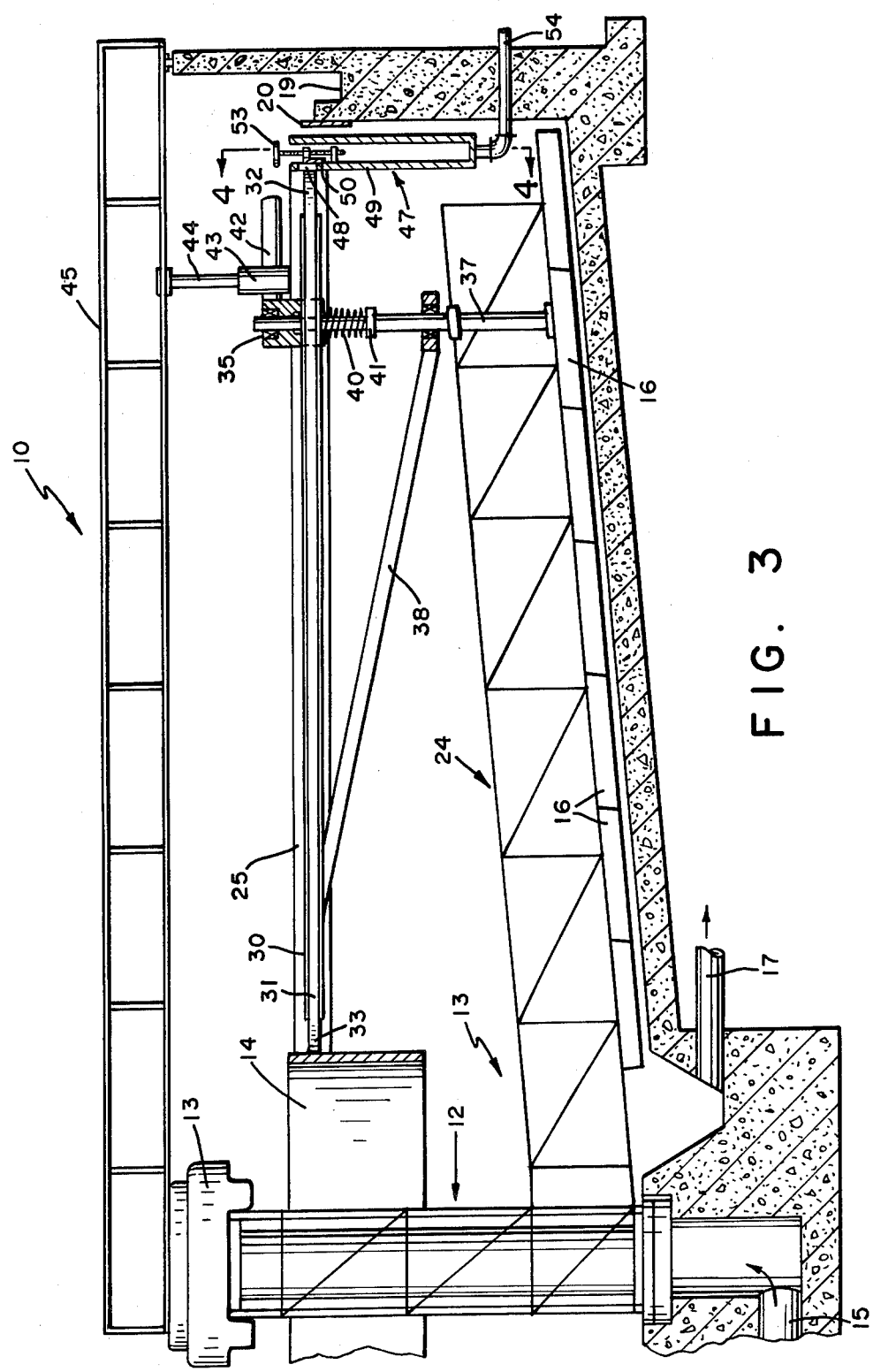
FIG. 3 is an enlarged elevational view of one rake arm and skimmer blade mechanism.

Referring now to the drawings for a more detailed description of the present invention, a sedimentation settling tank incorporating one embodiment thereof is generally indicated by the reference numeral 10 in FIGS. 1 to 3. A main rake structure 11 is supported for rotation about a center column 12 upon top of which is mounted a rake drive mechanism 13. A solids-liquid suspension such as municipal wastewater to be treated in settling tank 10 is supplied to a feedwell 14 arranged about center column 12 through a feed inlet pipe 15 at the bottom of tank 10. Solids or sludge which settle from the suspension accumulate at the bottom of tank 10 and are moved by rake blades 16 of rake structure 11 to a central sump outlet 17 of tank 10 in a usual manner. An overflow launder 19 (FIG. 1) extends about the upper periphery of tank 10 and is provided with a weir 20 which defines the upper liquid level in tank 10. Launder 19 receives the supernatant liquid over weir 20 for appropriate discharge from tank 10.

Settling tank 10 may be made of any suitable material such as concrete and as shown in FIG. 1 is of a generally circular configuration. Main raking structure 11 is of a usual construction and embodies spaced rake arms 22 and 24 attached to a suitable bearing means not shown at the base of center column 12 and through appropriate connecting means to drive mechanism 13 at the top of column 12 in a conventional manner. Rake arms 22 and 24 comprise steel cage structures to which are attached the rake blades 16 at the bottom surface thereof to engage and move the settled solids to sump 17 also in a usual manner.

It is known in devices of this type for scum or other material to float upon the upper surface of the liquid being treated. As mentioned it is the object of the present invention to provide skimmer means for removing this scum or other floating material from the surface of the liquid for discharge from tank 10. To this end a circular baffle member 25 (FIG. 1) concentric with and spaced from launder weir 20 is provided about the upper inner periphery of tank 10 and is secured thereto by spaced struts 26. Baffle 25 is of a greater height than launder weir 20 and supernatant clarified liquid flows under baffle 25 and over weir 20 for discharge to launder 19. The floating material on the surface of the liquid is contained by baffle 25 and prevented thereby from overflowing into launder 19.

Skimmer means for moving the scum or other floating material are provided and include spaced skimmer mechanisms 28 carried by rake arms 22 and 24 (FIG. 1). Skimmer means mechanisms 28 are identical for each rake arm 22 and 24 and description thereof is directed to skimmer mechanism 28 at rake arm 24 (FIG. 3). Skimmer 28 includes an elongated curved wiper blade 30 having a rubber wiper or squeegee 31 secured to the outer surface thereof. The opposite ends 32 and 33 of rubber wiper 31 engage respectively baffle 25 and the outer surface of feedwell 14.

Blade 30 is attached to a bushing 35 by means of a bracing arm 36 and which bushing 35 is rotatably mounted on the upper portion of a pivot post 37 secured to rake arm 24. A brace member 38 has an upper end (FIG. 3) secured to the inner end of blade 30 with its opposite lower end pivotally mounted about the bottom of post 37. A torsion spring 40 is interconnected to bushing 35 and a collar 41 on post 37 and urges wiper blade 30 about pivot post 37 in a clockwise direction (as seen in FIG. 1). A cam arm 42 is connected to bushing 35 spaced from wiper blade 30 for engaging an actuating roller member 43 mounted on a rod 44 depending from a walkway structure 45 in a manner to be more fully described.

A scum collector tank 47 (FIGS. 3 and 4) is provided adjacent walkway 45 and is attached to the rear surface of baffle 25. An elongated opening 48 of the approximate length of a blade 30 is provided in front wall 49 of collector 47 at a level above the top of weir 20. An adjustable dam mechanism is provided for varying the height and size of opening 48 in accordance with the selected liquid level in tank 10 and includes an elongated strip member 50 extending the length of opening 48 and secured to spaced threaded screw members 52. The rotation of wheels 53 of screws 52 will cause screws 52 to move strip 50 vertically to adjust the height of strip 50 to simultaneously adjust the size of opening 48.

In operation of skimmer means 28 upon rotation of rake structure 11 floating material on the surface of the liquid in tank 10 will be engaged by wiper 31 on blade 30. As rake arm 24 moves under walkway 45 cam arm 42 of skimmer means 28 will engage cam roller 43 causing skimmer blade 30 to pivot about roller 41 counterclockwise (FIG. 1) in the direction of collector tank 47 moving the floating material into opening 48 thereof for discharge from tank 10 through pipe 54 at the base of collector 47. As rake arm 24 continues to rotate cam arm 42 maintains engagement with roller 42 until the curved configurated surface of wiper blade 30 (as illustrated in broken lines positions of movement in FIG. 1) fully engages front wall 49 of collector 47 at which time cam arm 42 moves clear of roller 43. Wiper blade 30 is returned clockwise (FIG. 1) to its fully extended operative sweeping position engaging feedwell wall 14 by the action of torsion spring 40 preparatory to reoperation upon completion of the next revolution of rake arm 24 and after the skimmer mechanism 28 carried by rake arm 22 has been operated in the same manner as described with respect to the skimmer mechanism 28 of rake arm 24.

As will be appreciated from the foregoing description the novel skimmer mechanism described has many advantages in use. Among other advantages is the fact that a relatively non-complex mechanism is provided for completing a full diameter sweep of a liquid surface for effectively removing floating material from the surface thereof.

Although one embodiment of the present invention has been described in detail, it is to be expressly understood that the invention is not limited thereto. Various changes can be made in the design and arrangement of parts without departing from the spirit and scope thereof as the same will now be understood by those skilled in the art.

What is claimed is:

1. In a circular settling tank for separating solids from a solids-liquid suspension feed input, a feedwell arranged at the center of the tank for receiving said feed input, an overflow launder extending about the upper outer periphery of the tank for discharging supernatant liquid separated from solids settled at the tank bottom, a second outlet means at the bottom of the tank for said settled solids, a rotary rake structure having spaced rake arms effective to move said solids over said tank bottom to said second outlet means, a circular baffle about the inner upper periphery of said tank spaced from said launder, and skimmer means provided between said feedwell and baffle for sweeping floating materials from the surface of the supernatant liquid to a collector mounted at said baffle at the periphery of said tank, said skimmer means comprising:
 a. an elongated wiper arm carried by at least one rake arm, and extending radially across the tank, said arm having one end engaging said baffle and the other end engaging the outer wall surface of said feedwell in operative sweeping position,
 b. spring means maintaining said ends of said wiper arm in engaged operative position with said feedwell and said baffle, and
 c. cam actuated means carried by said wiper arm and operable for moving said wiper arm about a pivot to disengage said other end of said wiper arm from said feedwell and move said wiper arm into engagement with said peripheral baffle to sweep floating material into said collector through an elongated opening therein.

2. The skimmer means of claim 1 wherein said wiper arm includes an elongated blade member and wherein said cam actuator means include a cam arm interconnected to said blade member and a cam actuating roller fixed to said settling tank for engaging said cam arm during rotation of said rake arm to pivot said blade member in the direction of said collector.

3. The skimmer means of claim 2 wherein said opening in said collector a length approximately equal to the length of said blade for receiving floating material from said blade member in engaged position with said collector.

4. The skimmer means of claim 3 wherein means are provided for adjusting the longitudinal size of said opening in said collector.

5. The skimmer means of claim 4 wherein said size adjustment means include a strip member mounted on the rear wall of said collector and screw threaded means for adjusting the vertical height of said strip member relative to said opening.

6. The skimmer means of claim 1 wherein said pivot comprises a pivot post secured in vertical position on said rake arm and wherein interconnecting means are provided to pivotally connect said blade member to said post.

7. The skimmer means of claim 6 wherein said spring means comprises a torsion spring carried by said pivot post and operable to move said blade member to its operative sweeping position upon disengagement of said cam arm from said cam actuating roller.

8. The skimmer means of claim 6 wherein said interconnecting means include a bushing connected to said pivot post and an arm extension of said blade pivotally connected to said bushing.

9. The skimmer means of claim 8 wherein a bracing member has one end connected to said blade and the opposite end pivotally connected to said pivot post at rake arm.

10. The skimmer means of claim 9 wherein an elongated squeegee member is secured to said blade member for sweeping the surface of said supernatant liquid.

* * * * *